United States Patent [19]

Ueda et al.

[11] Patent Number: 5,502,486

[45] Date of Patent: Mar. 26, 1996

[54] IMAGE SENSING APPARATUS WHICH CAN DETECT OPTICAL CHARACTERISTICS OF AN IMAGE TO CONTROL TITLE INSERTION

[75] Inventors: Osamu Ueda; Koji Takahashi, both of Kanagawa, Japan

[73] Assignee: Canon Kabushiki Kaisha, Tokyo, Japan

[21] Appl. No.: 203,695

[22] Filed: Feb. 28, 1994

Related U.S. Application Data

[63] Continuation of Ser. No. 869,466, Apr. 15, 1992, abandoned.

[30] Foreign Application Priority Data

Apr. 25, 1991 [JP] Japan .................................. 3-095553
Oct. 23, 1991 [JP] Japan .................................. 3-275516

[51] Int. Cl.$^6$ .................................................. H04N 5/278
[52] U.S. Cl. ........................... 348/239; 348/561; 348/586; 348/589
[58] Field of Search ...................... 358/183, 209, 358/180, 185, 310, 335; 348/556, 558, 561, 563, 564, 578, 581, 239, 240, 458, 589, 704, 586; H04N 5/278, 5/262, 5/445, 5/46, 5/225, 5/272, 5/265, 5/92, 5/79

[56] References Cited

U.S. PATENT DOCUMENTS

| | | | |
|---|---|---|---|
| 4,613,906 | 9/1986 | Tanaka et al. | 348/239 |
| 4,851,897 | 7/1989 | Inuma et al. | 358/209 X |
| 4,999,709 | 3/1991 | Yamazaki et al. | 348/239 |
| 5,016,093 | 5/1991 | Yoshida et al. | 358/41 |
| 5,016,112 | 5/1991 | Nakajima et al. | 358/185 X |
| 5,126,832 | 6/1992 | Lee et al. | 348/589 |
| 5,161,236 | 11/1992 | Nakayama et al. | 348/563 |
| 5,175,624 | 12/1992 | Hieda et al. | 348/563 |
| 5,298,995 | 3/1994 | Monta et al. | 348/458 |

FOREIGN PATENT DOCUMENTS

| | | | |
|---|---|---|---|
| 326327 | 8/1989 | European Pat. Off. | H04N 5/278 |
| 356336 | 2/1990 | European Pat. Off. | H04N 5/278 |
| 510642 | 10/1992 | European Pat. Off. | H04N 5/278 |
| 2-295282 | 12/1990 | Japan | H04N 5/278 |
| 11472 | 1/1992 | Japan | H04N 5/265 |
| 326261 | 11/1992 | Japan | H04N 5/225 |

*Primary Examiner*—James J. Groody
*Assistant Examiner*—Chris Grant
*Attorney, Agent, or Firm*—Robin, Blecker, Daley and Driscoll

[57] ABSTRACT

There is provided an image sensing apparatus which comprises a detecting part for detecting an optical characteristic of a photographic optical system, an image sensing part for converting an optical image photographed by the photographic optical system into an electrical signal, a combining part for combining character information with image information outputted from the image sensing part, and a control part for controlling a combining operation of the combining part in accordance with an output of the detecting part. There is also provided an image sensing apparatus which comprises a detecting part for detecting an optical characteristic of a photographic optical system, an image sensing part for converting an optical image photographed by the photographic optical system into an electrical signal, a character information generating part for generating character information to be combined with image information outputted from the image sensing part, and a compressing part for compressing the character information in accordance with an output of the detecting part.

37 Claims, 8 Drawing Sheets

IMAGE SENSING APPARATUS WHICH CAN DETECT OPTICAL CHARACTERISTICS OF AN IMAGE TO CONTROL TITLE INSERTION

This is a continuation application under 37 CFR 1.62 of prior application Ser. No. 07/869,466, filed Apr. 15, 1992 now abandoned.

BACKGROUND OF THE INVENTION

1. Field of the Invention

The present invention relates to an image sensing apparatus and, more particularly, to a method of combining a character pattern with a video signal obtained by image sensing.

2. Description of the Related Art

In the NTSC system which is one existing standard television system, the aspect ratio, i.e., the ratio of the frame width and the frame height of a screen, is 4:3. As a matter of course, imaging apparatus such as cameras and displays are designed on the assumption that the aspect ratio is 4:3.

In such a situation, an ED.TV (extended definition TV) broadcasting system having an aspect ratio of, for example, 16:9 which is wider than the existing aspect ratio has recently been considered in order to provide a television broadcast which is improved in image quality and presence. If the ED.TV broadcasting system is practiced, there will be provided imaging apparatus such as cameras and displays which adopt wider screens while basically conforming to an existing television system such as the NTSC system.

Figure 6:
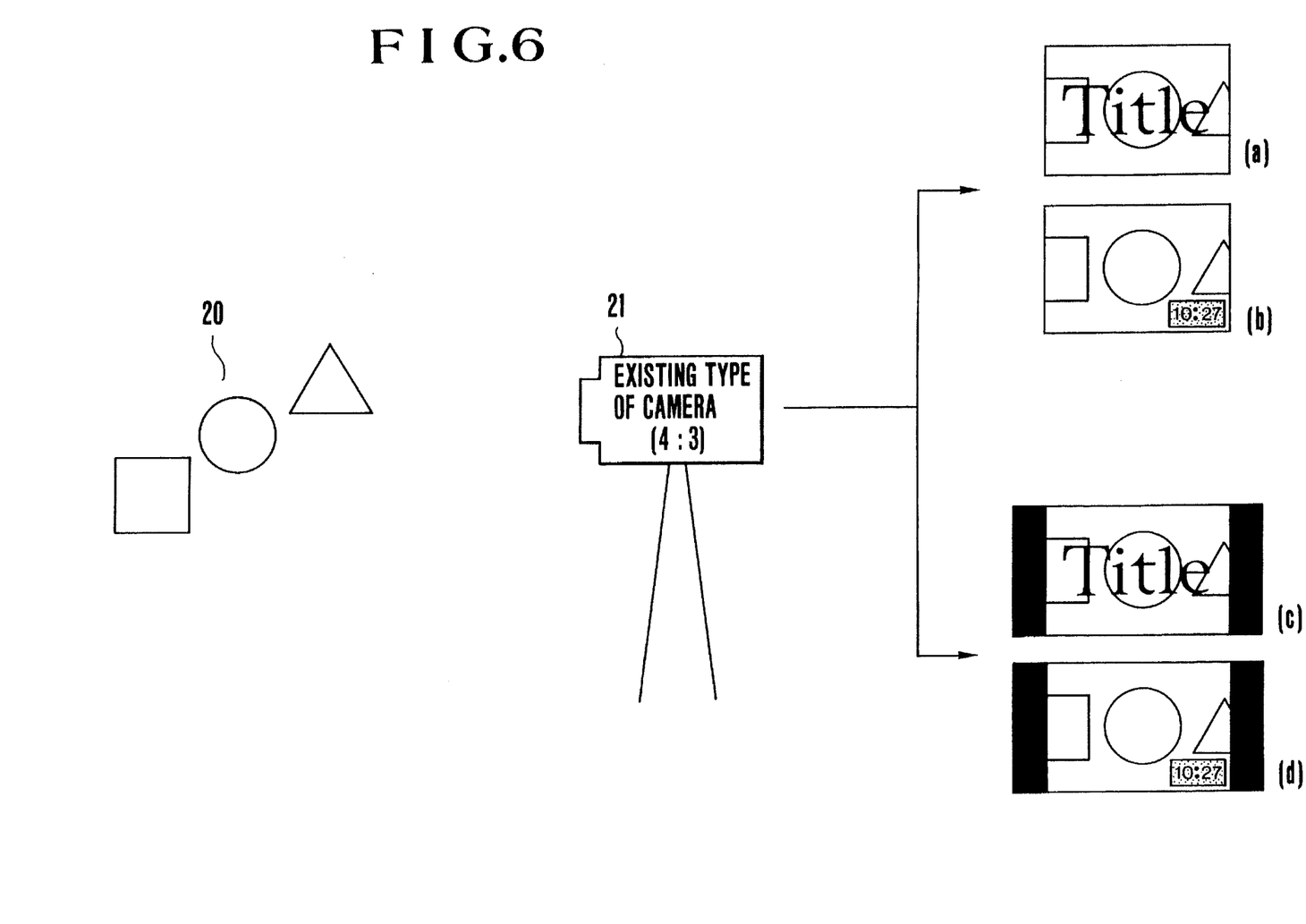
FIG. 6 is a schematic view showing the manners of images which are respectively reproduced on display screens when an image recorded by a conventional image sensing system is displayed on displays, one having an aspect ratio of 4:3 and the other 16:9.
Figure 7:
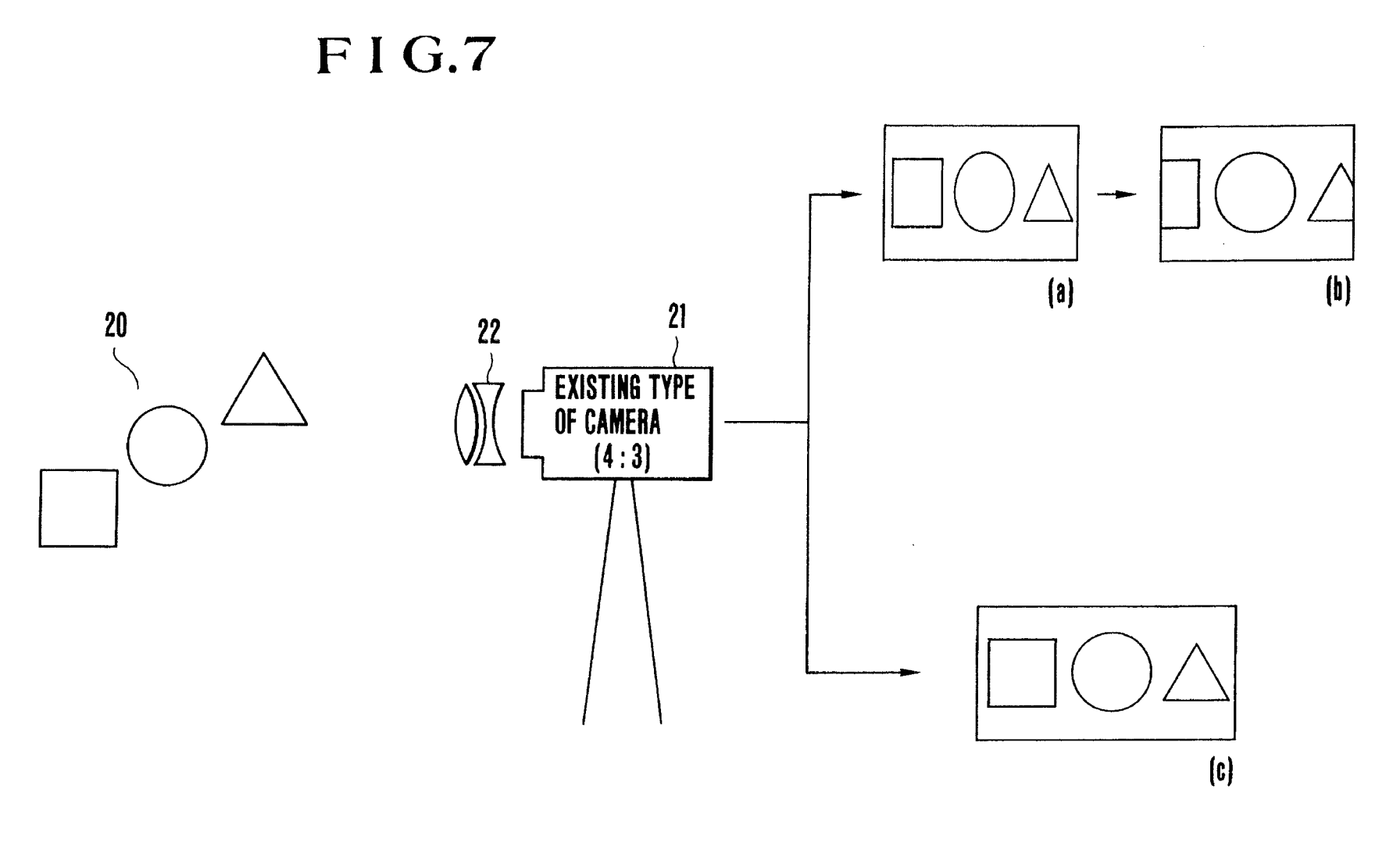
FIG. 7 is a schematic view showing the manners of images which are respectively reproduced on display screens when an image sensed through an anamorphic lens is displayed on displays, one having an aspect ratio of 4:3 and the other 16:9.
Figure 8:
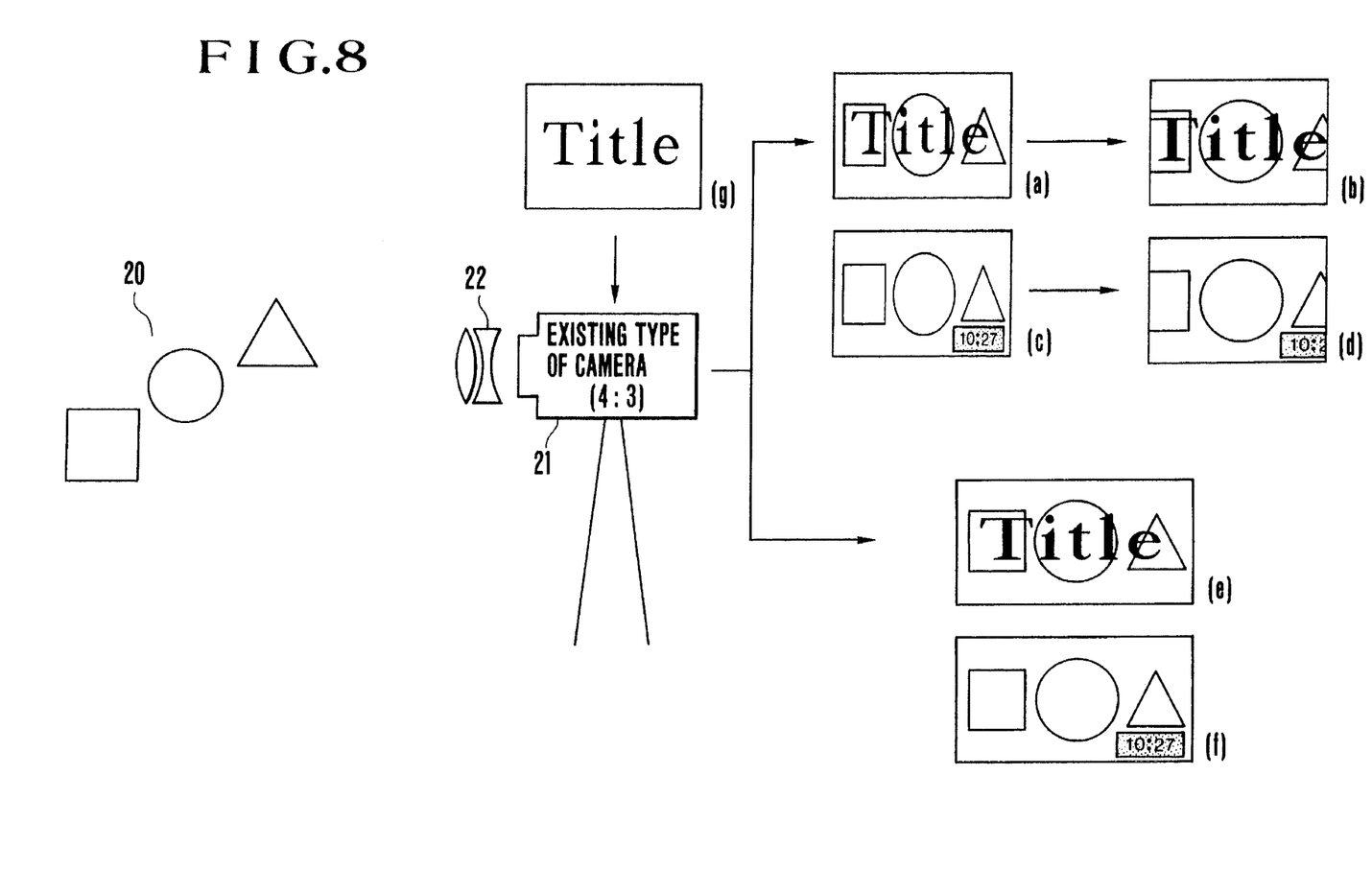
FIG. 8 is a schematic view showing the manners of images which are respectively displayed on conventional display screens when an image sensed through an anamorphic lens is combined with character information and the resultant image is displayed on displays, one having an aspect ratio of 4:3 and the other 16:9.

FIGS. 6 to 8 illustrate various images which are reproduced on a display from an image photographed by a conventional video camera.

In FIG. 6, a subject 20 has a size which can be completely viewed through an optical system having the angular field of view equivalent to the 16:9 aspect ratio, and a video camera 21 is of an existing type which employs an image sensing system having an aspect ratio of 4:3.

Conventionally, the video camera 21 is provided with the function of superimposing information such as a title on a sensed image on a screen by combining character information with image information obtained by image sensing, and recording the superimposed information such as a title together with the sensed image.

In FIG. 6, each of display examples (a) to (d) shows a different, specific displayed image in which a title or a display of the time of photography is combined with a photographed image.

In the case of an existing type of display (4:3 aspect ratio), a visual display is provided like the display example (a) or (b) shown in FIG. 6.

In the case of a wide display (16:9 aspect ratio), areas free of a signal appear on both ends of the screen, but combined character information is correctly displayed, as shown by each of the display examples (c) and (d) of FIG. 6.

The state of an image which is reproduced on a display screen when an image sensed through an anamorphic lens is displayed on a display will be described below with reference to FIG. 7.

Figure 1:
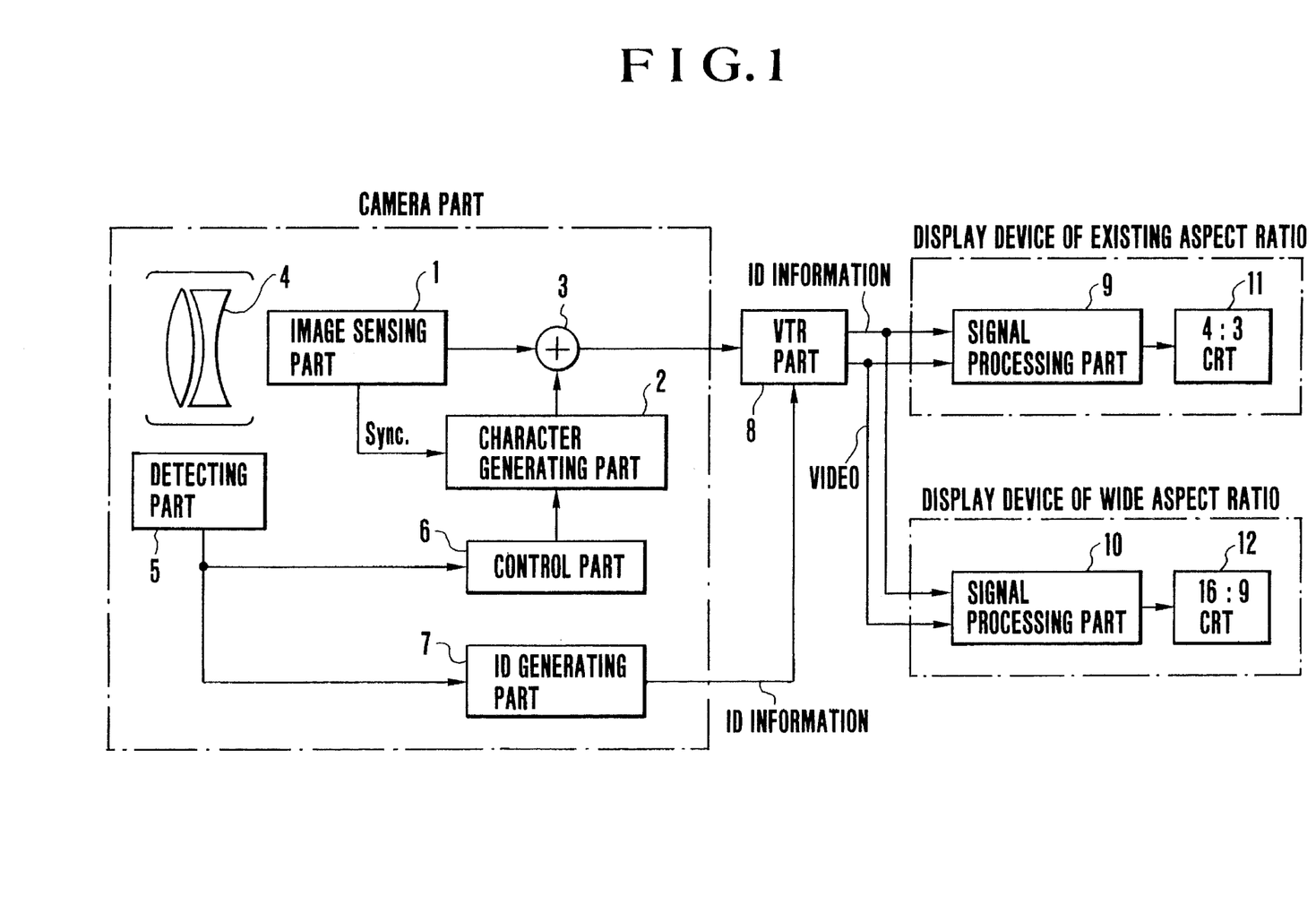
FIG. 1 is a schematic block diagram showing the essential parts of an image sensing system according to a first embodiment of the present invention.

In FIG. 7, the same reference numerals are used to denote portions which are substantially identical to or correspond to those shown in FIG. 1, and the description thereof is omitted.

In FIG. 7, a linear compression optical system (anamorphic lens) 22 is detachably attachable to the video camera 21.

The video camera 21 is capable of varying the aspect ratio of a photographed image by compressing the photographed image by means of the anamorphic lens 22, and forming an image of wide aspect ratio by image sensing.

When the thus-sensed image is to be reproduced on a display, expansion processing reverse to the compression processing performed during the photography is carried out.

If such a sensed image is reproduced on a display having a screen of wide aspect ratio, an image without any problem is displayed like the display example (c) shown in FIG. 7, and the subject 20 is faithfully reproduced.

If the image sensed by the video camera 21 is reproduced on a display having the existing 4:3 aspect ratio, a vertically elongated image which has been compressed to ¾ along its frame width is reproduced on the display. As a result, a distorted image like the display example (a) of FIG. 7 will be reproduced.

To cope with the above-described problem, it is proposed to adopt a display method including the steps of applying expansion processing to an image during reproduction in a manner similar to the manner in which a visual display is provided on the display having a screen of wide aspect ratio, cutting both sides from the image and displaying the image in such a manner that it is accommodated within a screen having the 4:3 aspect ratio (refer to the display example (b) of FIG. 7).

However, the display method of providing a visual display like the display example (b) of FIG. 7 has a number of problems. For example, if information, such as the date or time of photography, is combined with a sensed image, the information is usually located at a corner of the screen. As a result, an image devoid of such information will be reproduced on the screen of a display, as shown by the display example (d) of FIG. 8, and it will be impossible to confirm, for example, the time of photography.

As described previously, conventionally, the video camera 21 is provided with the function of superimposing information such as a title on a sensed image on a screen by combining character information with image information, and recording the superimposed information together with the sensed image.

However, if an image of wide aspect ratio is photographed with an existing type of camera using the above-described anamorphic lens and is recorded by means of the aforesaid function, the following problem will occur. If an image which has not been subjected to expansion processing is displayed on a display of standard aspect ratio, an image like the display example (a) of FIG. 8 will be displayed, that is, the title is displayed without distortion, but the photographed image is distorted.

If such a photographed image is subjected to expansion processing and displayed on a display of standard or wide aspect ratio, the photographed image will be displayed without distortion.

However, since title information which has been combined with the image is also expanded during the expansion processing, the character information shown as a display example (g) in FIG. 8 is displayed on the screen in a horizontally expanded shape during reproduction. As a result, the shapes of individual characters indicative of the title information differ from those of the original characters used during the combination (refer to display examples (b) and (e) in FIG. 8).

SUMMARY OF THE INVENTION

It is, therefore, an object of the present invention to provide an image sensing apparatus and an image sensing system each of which makes it possible to solve the problems described above in the background of the invention, and each of which makes it possible to display reliably a photographed image together with character information on a screen without graphical distortion during reproduction if an image obtained by optically varying the aspect ratio of the photographed image and forming an image having a varied aspect ratio by image sensing is combined with the character information such as a title or the time of photography.

To achieve the above object, in accordance with one aspect of the present invention, there is provided an image sensing apparatus which comprises detecting means for detecting an optical characteristic of a photographic optical system, image sensing means for converting an optical image photographed by the photographic optical system into an electrical signal, combining means for combining character information with image information outputted from the image sensing means, and controlling means for controlling a combining operation of the combining means in accordance with an output of the detecting means.

In accordance with another aspect of the present invention, there is provided an image sensing apparatus which comprises detecting means for detecting an optical characteristic of a photographic optical system, image sensing means for converting an optical image photographed by the photographic optical system into an electrical signal, character information generating means for generating character information to be combined with image information outputted from the image sensing means, and compressing means for compressing the character information in accordance with an output of the detecting means.

Other objects and advantages of the invention will become apparent from the following detailed description taken in conjunction with the accompanying drawings.

DETAILED DESCRIPTION OF THE PREFERRED EMBODIMENTS

A first embodiment of the present invention will be described below in detail with reference to FIGS. 1 and 2.

FIG. 1 is a schematic block diagram showing the essential parts of an image sensing system according to the first embodiment of the present invention.

The image sensing system shown in FIG. 1 includes an image sensing part 1 for sensing an image by means of an image sensor having an existing 4:3 aspect ratio and outputting a video signal; a character generating part 2 for generating a character signal (information); a combining part 3 for combining the video signal outputted from the image sensing part 1 with the character signal generated by the character generating part 2; an anamorphic lens 4 detachably. attached to the image sensing part 1 for varying the aspect ratio of a photographed image by optically compressing the photographed image in the horizontal direction thereof; a detecting part 5 for detecting whether the anamorphic lens 4 has been attached or detached, as well as the characteristic of the anamorphic lens 4 (the conversion ratio of the aspect ratio of the anamorphic lens 4); and a control part 6 for controlling the character generating part 2.

The image sensing system shown in FIG. 1 includes an ID generating part 7 for outputting ID information associated with the anamorphic lens 4 in accordance with the output of the detecting part 5, and a video tape recorder part 8 (hereinafter referred to as the "VTR part 8") for recording a video signal outputted from the combining part 3 and the ID information outputted from the ID generating part 7.

Each of signal processing parts 9 and 10 performs the processing required to visually display a signal outputted from the VTR part 8. A display 11 has a display screen having an aspect ratio of 4:3, while a display 12 has a display screen having an aspect ratio of 16:9.

The photographic operation, recording operation and reproducing operation of the image sensing system having the above-described arrangement will be described below with reference to FIGS. 1 and 2.

A video signal and a synchronizing signal are outputted from the image sensing part 1 and inputted to the combining part 3 and the character generating part 2, respectively.

The character generating part 2 outputs to the combining part 3 a character signal synchronized with the synchronizing signal outputted from the image sensing part 1, under control of the control part 6.

A signal indicating whether the anamorphic lens 4 has been attached and the conversion ratio of an aspect ratio of the anamorphic lens 4 is inputted from the detecting part 5 to the control part 6. The control part 6 controls the operation of the character generating part 2 to generate a character signal, in accordance with the detection signal provided by the detecting part 5. In other words, a position on the screen at which character information is to be combined with a sensed image is controlled in accordance with the aforesaid detection signal.

It is expected that display devices of two kinds will become popular in the future, display devices of the kind conforming to a 4:3 aspect ratio and those of the kind conforming to a 16:9 aspect ratio. For this reason, each of the first embodiment and other embodiments which will be described later is arranged in the following manner: Even if an image of a subject is sensed with an anamorphic lens of arbitrary conversion ratio attached to the image sensing part 1, the character generating part 2 is controlled by the control part 6 in accordance with the detection result provided by the detecting part 5 so that the aforesaid character information is combined with the sensed image at a position on the screen where the character information does not disappear if the sensed image is displayed on a display having an aspect ratio of either 4:3 or 16:9.

The manner in which the position on the screen where character information is to be combined with a sensed image is determined in the first embodiment will be described below with reference to FIG. 2.

Figure 2:
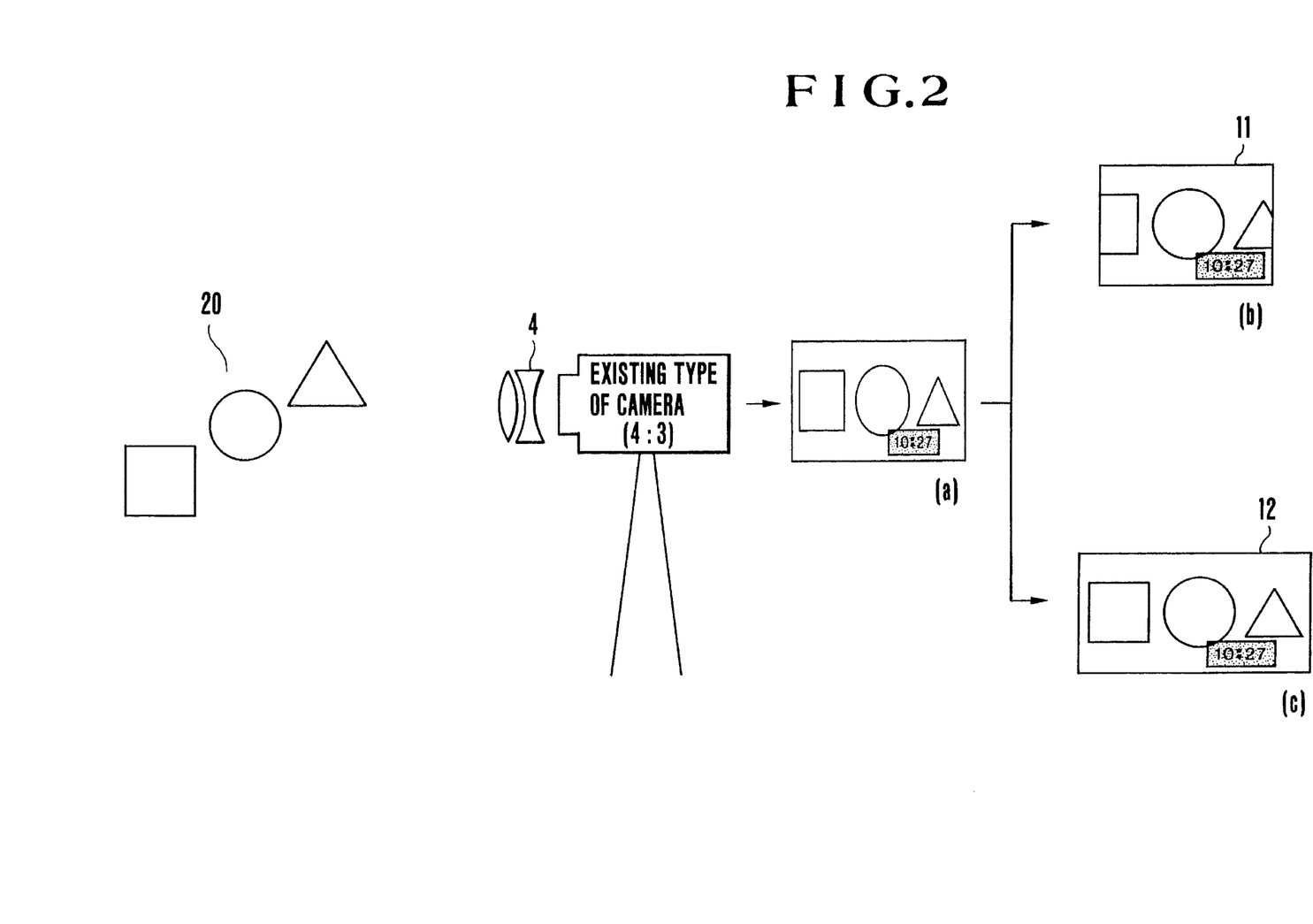
FIG. 2 is a schematic view showing the manners of images which are respectively reproduced on display screens when an image recorded by the image sensing system according to the first embodiment of the present invention is displayed on displays, one having an aspect ratio of 4:3 and the other 16:9.

FIG. 2 is a view aiding in obtaining a clear understanding of the first embodiment, and shows images which are displayed on different displays.

In FIG. 2, the same reference numerals are used to denote portions which are substantially identical to or correspond to those shown in FIG. 1. The anamorphic lens 4 converts the aspect ratio of a photographed image of a subject 20 from 16:9 to 4:3.

In FIG. 2, a display example (a) represents an image displayed on a screen when an image, which is outputted from a camera part when a display of the time of photography is combined with a photographed image, is displayed on a display having the standard 4:3 aspect ratio.

As can be seen from the display example (a) of FIG. 2, unlike the conventional display method (refer to the display example (c) of FIG. 8), the position where the time of photography is displayed is offset toward the inside of the screen.

The character signal generated in the above-described manner and the video signal outputted from the image sensing part 1 are combined with each other by the combining part 3 and inputted to the VTR part 8.

As will be described later, the video signal is outputted from the camera part in the form of a chrominance signal and two color-difference signals.

The video signal outputted from the combining part 3 is inputted to the VTR part 8. In the meantime, an ID signal indicating the conversion ratio of the aspect ratio of the anamorphic lens 4 and whether the anamorphic lens 4 has been attached, is inputted from the ID generating part 7 to the VTR part 8.

In the VTR part 8, the following processing is performed.

The aforesaid input ID signal is combined with a line blanking portion of the video signal as a pulse- or burst-like signal, and is recorded together with the video signal on a magnetic tape which serves as a recording medium. Otherwise, the ID signal may be recorded in a control track on the magnetic tape.

The processing of combining the ID signal with the video signal may also be performed on the camera-part side. If an arrangement in which such a processing is performed on the camera-part side is adopted, it will be sufficient to extend one signal line from the camera part to the VTR part 8.

In another processing, the luminance signal inputted from the camera part is converted into a frequency-modulated signal conforming to standards for the VTR part 8. The two color-difference signals are subjected to quadrature two-phase modulation using a subcarrier of 0.629 MHz in the case of, for example, a VHS-type VTR (the two color-difference signals may be down-converted by using a subcarrier of 0.629 MHz after they have been subjected to quadrature two-phase modulation using a subcarrier of 3.58 MHz), and, after that, combined with the frequency-modulated luminance signal. The resultant signal is amplified and recorded on the magnetic tape by means of a recording head.

During reproduction, the recorded signal is read out by a reproducing head and is amplified. Then, a frequency-demodulated Y signal and, in the NTSC system, a C signal whose subcarrier frequency is converted to 3.58 MHz are obtained from the amplified signal by means of a reproducing processing circuit. The Y signal and the C signal are combined and outputted to a particular display device connected to the VTR part 8.

In the VTR part 8, the ID signal is separated from the video signal with which it has been combined, and is also outputted to the display device.

The processing of separating the ID signal from the video signal may also be performed on the display-device side. If an arrangement in which such a processing is performed on the display-device side is adopted, it will be sufficient to extend one signal line from the VTR part 8 to the display device.

The video signal and the ID signal outputted from the VTR part 8 are processed in the display device in the following manner.

In the case of a display device having an existing aspect ratio, a signal processing part 9 is controlled in accordance with the ID signal.

Specifically, if it is determined from the ID signal that an image having a 16:9 aspect ratio has been photographed with the anamorphic lens 4 attached, the signal processing part 9 applies electrical expansion processing to the video signal and deletes both sides of the reproduced image, thereby displaying an image having a 4:3 aspect ratio on the display 11.

For example, if the time of photography is recorded together with a photographed image during recording, an image like a display example (b) of FIG. 2 is displayed during reproduction by virtue of the above-described recording method. Accordingly, unlike the conventional art (refer to the example (d) of FIG. 8), it is possible to prevent the display of the time of photography from being partially deleted during reproduction.

In the case of a display device having a 16:9 aspect ratio, a signal processing part 10 is controlled in accordance with the ID signal. The signal processing part 10 applies electrical expansion processing to the input video signal to restore the original aspect ratio of the photographed image. The resultant image is displayed on the display 12 (refer to a display example (c) of FIG. 2).

If the anamorphic lens 4 is not used, photography, recording and reproduction are performed in a conventional manner.

The above-described expansion processing may be performed by using an anamorphic lens.

Aspect-ratio information on the display device connected to the camera side may be supplied to the control part by selecting the aspect ratio of the connected display device by means of a switch or the like provided on the camera side, so that a position on the screen where character information is to be combined with a sensed image is controlled in accordance with the aspect-ratio information and information on the conversion ratio of the aspect ratio of an attached anamorphic lens.

An image sensing system according to a second embodiment of the present invention will be described below with reference to FIGS. 3 and 4.

Figure 3:
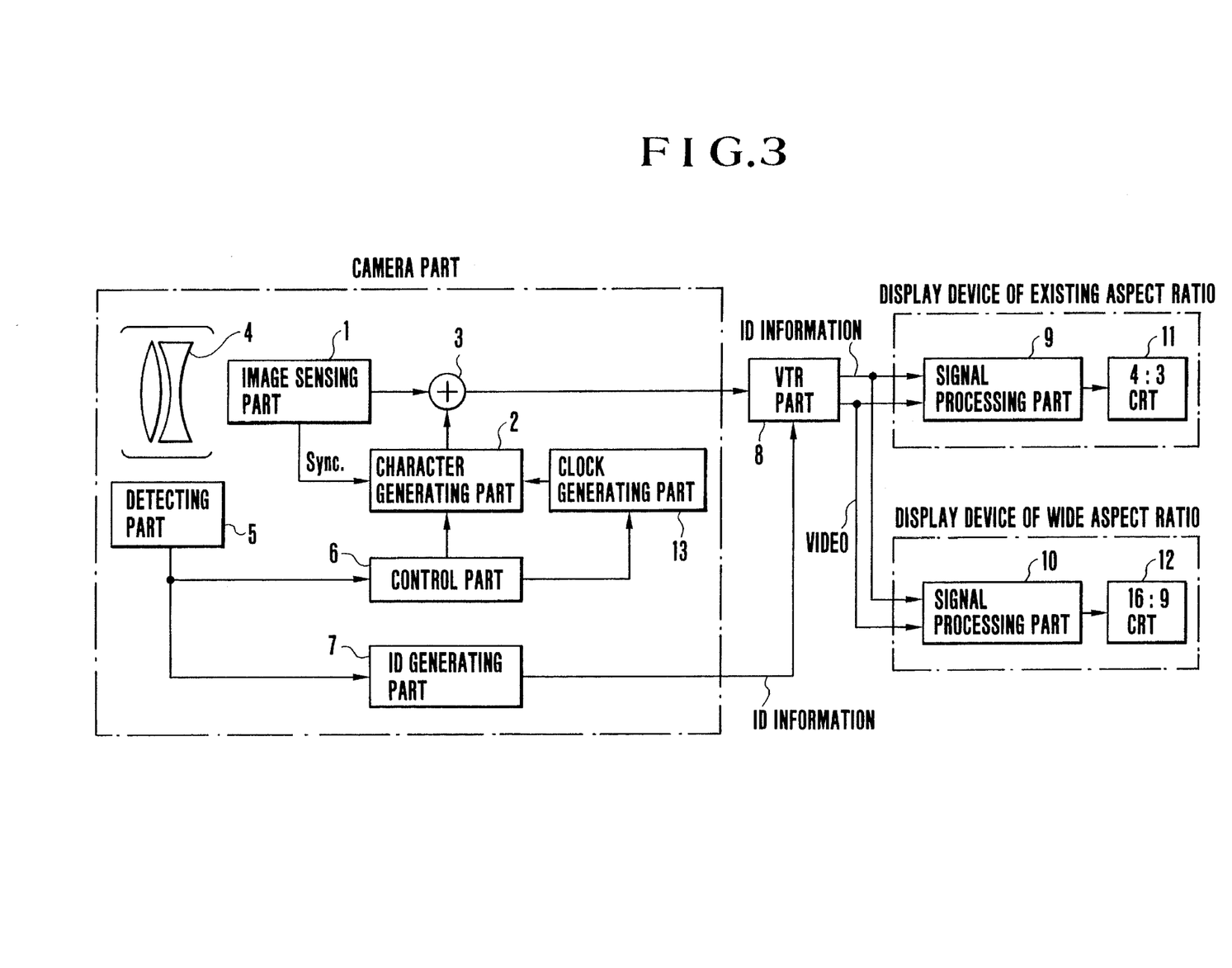
FIG. 3 is a schematic block diagram showing the essential parts of an image sensing system according to a second embodiment of the present invention.

FIG. 3 is a schematic block diagram showing the essential parts of the image sensing system according to the second embodiment of the present invention. In FIG. 3, the same reference numerals are used to denote parts which are substantially identical to or correspond to those shown in FIG. 1.

In the image sensing system shown in FIG. 3, a clock generating part 13 generates a reference signal for the character generating part 2.

In the second embodiment, the control part 6 controls the character generating part 2 and the clock generating part 13.

Regarding the photographic operation, recording operation and reproducing operation of the image sensing system having the above-described arrangement, only operational steps different from those referred to in connection with the first embodiment will be described below in detail with reference to FIGS. 3 and 4.

The detecting part 5 detects whether the anamorphic lens 4 has been attached or detached and the characteristic of the anamorphic lens 4 (the conversion ratio of an aspect ratio of the anamorphic lens 4). In response to the detection result provided by the detecting part 5, the control part 6 controls a clock period for character generation (that is, only the width of a character generated by the character generating part 2 is compressed or expanded).

For example, if the detecting part 5 determines that the anamorphic lens 4 has been attached and that the anamorphic lens 4 has the characteristic of compressing the aspect ratio of an image from 16:9 to 4:3, the control part 6 controls the clock generating part 13 in accordance with the detection result provided by the detecting part 5, and the frequency of a clock to be generated is increased in accordance with the ratio at which an image is expanded on a screen. Accordingly, the character generating part 2 outputs character information indicative of characters each having a compressed character width (refer to a display example (a) in FIG. 4).

Figure 4:
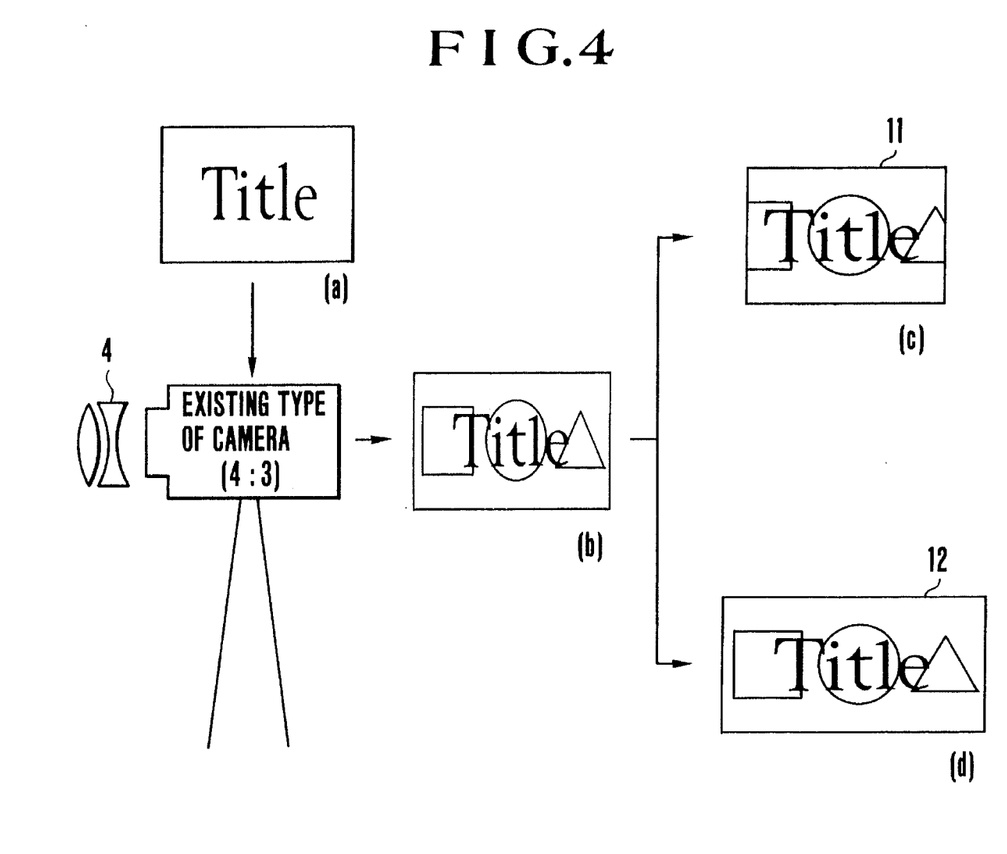
FIG. 4 is a schematic view showing the manners of images which are respectively reproduced on display screens when an image recorded by the image sensing system according to each of the second embodiment and a third embodiment of the present invention is displayed on displays, one having an aspect ratio of 4:3 and the other 16:9.

The character information indicative of characters compressed in the above-described manner is combined with image information outputted from an image sensing part 1 (refer to a display example (b) in FIG. 4), and the resultant information signal is recorded by the VTR part 8.

In the meantime, an ID signal indicative of the characteristic of the anamorphic lens 4 is inputted to the VTR part 8 from the detecting part 5, and such an ID signal is recorded together with the image information.

If the recorded image information is reproduced in a manner similar to that used in the first embodiment, an image is displayed as shown in display examples (c) and (d) in FIG. 4. Accordingly, whether the image information is reproduced on the display 11 having the existing aspect ratio or the display having the wide aspect ratio, the title characters combined with the image are displayed on the screen without distortion unlike the conventional art.

An image sensing system according to a third embodiment of the present invention will be described below with reference to FIGS. 4 and 5.

The third embodiment is a modification of the second embodiment.

Figure 5:
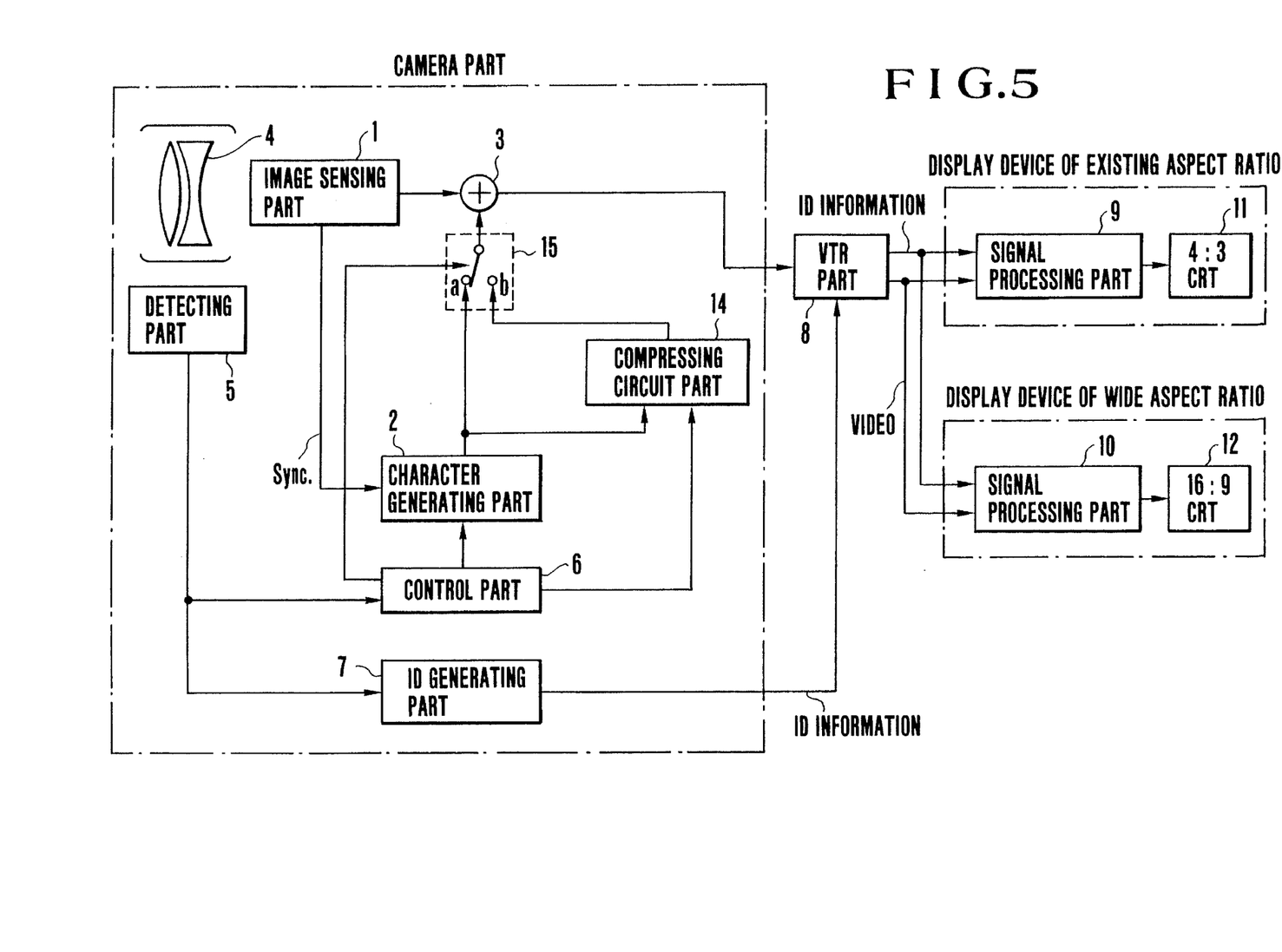
FIG. 5 is a schematic block diagram showing the essential parts of an image sensing system according to the third embodiment of the present invention.

FIG. 5 is a schematic block diagram showing the essential parts of the image sensing system according to the third embodiment of the present invention. In FIG. 5, the same reference numerals are used to denote parts which are substantially identical to or correspond to those shown in FIG. 1, and the description thereof is omitted.

In the image sensing system shown in FIG. 5, a compressing circuit part 14 compresses a character signal, and a selecting switch 15 is controlled by the control part 6.

Regarding the photographic operation, recording operation and reproducing operation of the image sensing system having the above-described arrangement, only operational steps different from those referred to in connection with the first and second embodiments will be described below in detail with reference to FIGS. 4 and 5.

During ordinary photography in which the anamorphic lens 4 is not used, the control part 6 controls the switch 15 so that the selecting member thereof makes contact with a terminal a. In the case where the terminal a is selected, combination of character information such as an ordinary title is carried out in a conventional manner.

When the detecting part 5 detects that the anamorphic lens 4 has been attached, the control part 6 controls the switch 15 so that the selecting member makes contact with a terminal b.

In accordance with the detection result (the characteristic of the anamorphic lens 4) provided by the detecting part 5, the control part 6 controls the compressing circuit part 14. The compressing circuit part 14 compresses character information such as a title outputted from the character generating part 2, in accordance with the characteristic of the anamorphic lens 4, and outputs the compressed character information like the display example (a) of FIG. 4.

Image information combined with the compressed character information is outputted from the camera part, as shown in the display example (b) of FIG. 4.

The image information outputted as the display example (b) of FIG. 4 is subjected to expansion processing as described above in connection with the first and second embodiments. In the case of an ordinary display (4:3 aspect ratio), the image information is displayed with both sides of the image deleted, as shown in the display example (c) of FIG. 4.

In the case of a display having the wide aspect ratio (16:9 aspect ratio), the image information is displayed as shown in the display example (d) of FIG. 4.

Accordingly, even if an image having the wide aspect ratio is photographed by means of an anamorphic lens and character information such as a title is combined with the photographed image, it is possible to display the image on a display without graphical distortion (refer to display examples (b) and (e) in FIG. 8) unlike the conventional art.

According to each of the embodiments described above, a device for optically varying the aspect ratio of a screen is added to an image sensing apparatus capable of combining character information with a sensed image, and character information is combined with an image sensed by the image sensing apparatus. However, since the position on the screen where the character information is to be combined can be moved, even if the resultant video signal is displayed on a display having a screen of existing aspect ratio with both ends of the image deleted, the combined character information can be displayed in a complete form.

In addition, when a compressed, sensed image is to be combined with character information, the width of the character information is varied (for example, reduced) in the horizontal scanning direction. Accordingly, during reproduction, the resultant video output signal can be visually displayed in an expanded form with no graphical distortion occurring in the combined characters.

It is apparent that if the first embodiment and the second or third embodiment are combined, it is possible to achieve advantages similar to those described above.

The present invention may be practiced in various other ways without departing from the spirit or essential feature thereof.

For example, although the camera part, the VTR part and the display device are separately arranged in each of the above-described embodiments, it is apparent that they may also be arranged as an integrated system.

In each of the embodiments, the detecting part 5 automatically detects whether the anamorphic lens 4 has been attached or detached and the conversion ratio of an aspect ratio of the anamorphic lens 4. However, it is also possible to adopt an arrangement in which a photographer manually inputs the required information to the control part 6 by means of a switch provided on the camera side.

The foregoing description of the embodiments has been given for illustrative purposes only and not to be construed as imposing any limitation in every respect. The scope of the invention is, therefore, to be determined solely by the following claims and not limited by the text of the specification. Further, it is to be understood that all modifications and alterations made within a scope equivalent to the scope of the claims fall within the true spirit and scope of the invention.

What is claimed is:

1. An image sensing apparatus comprising:
   a) an optical system capable of varying an aspect ratio of a photographed image;
   b) detecting means for detecting a conversion ratio of said optical system;
   c) image sensing means for converting an optical image photographed by said optical system into an electrical signal;
   d) combining means for combining character information with image information outputted from said image sensing means; and
   e) controlling means for controlling a combining operation of said combining means in accordance with an output from said detecting means.

2. An image sensing apparatus according to claim 1, wherein said optical system includes an anamorphic lens.

3. An image sensing apparatus according to claim 1, wherein the character information includes information indicative of a time of photography.

4. An image sensing apparatus according to claim 1, wherein the character information includes information indicative of a date of photography.

5. An image sensing system comprising:
   a) an optical system for forming an image of a subject as an optical image;
   b) detecting means for detecting an optical characteristic of said optical system;
   c) identification information generating means for generating identification information associated with the optical characteristic from an output of said detecting means;
   d) image sensing means for converting the optical image photographed by said optical system into an electrical signal;
   e) character information generating means for generating character information;
   f) combining means for combining the character information with image information indicated by the electrical signal formed by said image sensing means;
   g) controlling means for controlling a combining operation of said combining means in accordance with an output of said detecting means; and
   h) recording means for recording the image information combined with the character information by said combining means on a recording medium together with the identification information.

6. An image sensing system comprising:
   a) an optical system for forming an image of a subject as an optical image;
   b) detecting means for detecting an optical characteristic of said optical system;
   c) identification information generating means for generating identification information associated with the optical characteristic from an output of said detecting means;
   d) image sensing means for converting the optical image photographed by said optical system into an electrical signal;
   e) character information generating means for generating character information;
   f) combining means for combining the character information with image information indicated by the electrical signal formed by said image sensing means;
   g) controlling means for controlling a combining operation of said combining means in accordance with an output of said detecting means;
   h) recording means for recording the image information combined with the character information by said combining means on a recording medium together with the identification information;
   i) read-out means for reading out the image information and the identification information from the recording medium;
   j) converting means for converting an aspect ratio of the read image information on the basis of the identification information; and
   k) adjusting means for adjusting the image information to an aspect ratio of a screen on which the image information is to be displayed.

7. An image sensing apparatus comprising:
   a) detecting means for detecting an optical characteristic of a photographic optical system;
   b) image sensing means for converting an optical image photographed by the photographic optical system into an electrical signal;
   c) combining means for combining character information with image information outputted from said image sensing means; and
   d) controlling means for controlling a combining operation of said combining means in accordance with an output of said detecting means.

8. An image sensing apparatus according to claim 7, wherein said photographic optical system includes an anamorphic lens.

9. An image sensing apparatus according to claim 8, wherein the optical characteristic is a conversion ratio of an aspect ratio of the anamorphic lens.

10. An image sensing apparatus comprising:
   a) an aspect-ratio converting optical system capable of varying an aspect ratio of a photographed image;
   b) image sensing means for converting an optical image photographed by said optical system into an electrical signal;
   c) detecting means for detecting whether said aspect-ratio converting optical system has been attached;
   d) combining means for combining character information with image information outputted from said image sensing means; and
   e) controlling means for controlling a position on a screen where the character information is to be combined, in accordance with an output of said detecting means.

11. An image sensing apparatus comprising:
   a) image sensing means capable of outputting a first image signal and a second image signal indicative of an image having an angular field of view which is enlarged only in a predetermined direction with respect to an angular field of view of an image indicated by the first image signal;
   b) generating means for generating a third image signal other than the first and second image signals; and
   c) combining means for combining the image signal outputted from said image sensing means with the third image signal;
   said generating means generating the third image signal at a timing when the third image signal is combined with a portion of the second image signal which is defined not within the enlarged angular field of view but within the angular field of view of the image indicated by the first image signal.

12. An image sensing apparatus according to claim 11, wherein the third image signal is an image signal having binary levels.

13. An image sensing apparatus according to claim 12, wherein the third image signal has image information indicative of information on a character.

14. An image sensing apparatus according to claim 11, wherein a timing when said generating means generates the third image signal when said image sensing means outputs the first image signal differs from a timing when said generating means generates the third image signal when said image sensing means outputs the second image signal.

15. An image sensing apparatus according to claim 11, wherein the angular field of view of the image indicated by the second image signal is expanded horizontally with respect to the angular field of view of the image indicated by the first image signal.

16. An image sensing apparatus comprising:
   a) image sensing means capable of outputting a first image signal and a second image signal indicative of an image having an angular field of view which is enlarged only in a predetermined direction with respect to an angular field of view of an image indicated by the first image signal;
   b) generating means for generating a third image signal other than the first and second image signals, a timing when said generating means generates the third image signal when said image sensing means outputs the first image signal being selected to differ from a timing when said generating means generates the third image signal when said image sensing means outputs the second image signal; and
   c) combining means for combining an image signal outputted from said image sensing means with the third image signal.

17. An image sensing apparatus according to claim 16, wherein said generating means generates, when said image sensing means outputs the first image signal, the third image signal over the entire period during which the first image signal is generated, while when said image sensing means outputs the second image signal, said generating means generates the third image signal for only a portion of the period during which the second image signal is generated.

18. An image signal processing apparatus, comprising:
   a) input means for inputting an image signal;
   b) aspect-ratio converting means for converting an aspect-ratio of said image signal;
   c) combining means for combining a character signal with said converted image signal;
   d) detecting means for detecting a converting characteristic of said converting means; and
   e) control means for controlling a combining operation of said combining means, in response to an output of said detecting means.

19. An apparatus according to claim 18, wherein said character signal is an information signal indicating a time.

20. An apparatus according to claim 18, wherein said character signal is an information signal indicating a date.

21. A video camera which mounts the image signal processing apparatus according to claim 18.

22. An image signal processing apparatus, comprising:
   a) input means for inputting an image signal;
   b) aspect-ratio converting means for converting an aspect-ratio of said image signal;
   c) combining means for combining a character signal with said converted image signal;
   d) generating means for generating an indicating signal relating to a converting characteristic of said converting means; and
   e) control means for controlling a combining operation of said combining means in response to the indicating signal generated by said generating means.

23. A video camera which mounts the image signal processing apparatus according to claim 22.

24. An apparatus according to claim 22, wherein said converting means is arranged to convert the aspect-ratio by an anamorphic lens.

25. An image signal processing apparatus, comprising:
   a) input means for inputting a first image signal;
   b) converting means for converting an aspect-ratio of said first image signal;
   c) detecting means for detecting a converting characteristic of said converting means;
   d) generating means for generating a second image signal, said generating means being arranged so that a timing of generating the second image signal is controlled in response to an output of said detecting means; and
   e) combining means for combining said converted first image signal and said second image signal.

26. An apparatus according to claim 25, wherein said second image signal is an image signal having binary levels.

27. A video camera which mounts the image signal processing apparatus according to claim 25.

28. An image signal processing apparatus comprising:

a) input means for inputting first image signal;

b) detecting means or detecting an aspect ratio of the first image signal input by said input means;

c) combining means for combining a second image signal with the first image signal output from said input means; and d) controlling means for controlling a combining operation of said combining means in accordance with an output from said detecting means.

29. An apparatus according to claim 28, wherein said input means includes image pickup means for converting an optical image into an electrical signal.

30. An apparatus according to claim 29, wherein said input means includes conversion means for compressing or expanding images having various aspect ratios into an image having a predetermined aspect ratio.

31. An apparatus according to claim 28, comprising further combining means for combining aspect ratio information associated with aspect ratio detected by said detecting means with the first image signal output from said input means.

32. An apparatus according to claim 31, further comprising recording means for recording an image signal output from said combining means on a recording medium.

33. An apparatus according to claim 32, further comprising reproduction means for reproducing the image signal recorded by said recording means.

34. A video camera which mounts the image signal processing apparatus according to claim 28.

35. An apparatus according to claim 28, wherein the second image signal is a character signal.

36. An apparatus according to claim 28, further comprising recording means for recording an image signal output from said combining means on a recording medium.

37. An apparatus according to claim 36, further comprising reproduction means for reproducing the image signal recorded by said recording means.

* * * * *

UNITED STATES PATENT AND TRADEMARK OFFICE
CERTIFICATE OF CORRECTION

PATENT NO. : 5,502,486
DATED : March 26, 1996
INVENTOR(S) : Osamu Ueda, et al.

It is certified that error appears in the above-indentified patent and that said Letters Patent is hereby corrected as shown below:

Col. 4, line 32, change "detachably.attached" to -- detachably attached --.

Col. 13, line 2, change "or" to -- for --.

Signed and Sealed this

Third Day of December, 1996

Attest:

BRUCE LEHMAN

Attesting Officer    Commissioner of Patents and Trademarks